United States Patent [19]

Ichimura et al.

[11] Patent Number: 5,706,131
[45] Date of Patent: Jan. 6, 1998

[54] POLARIZING ELEMENT, POLARIZING PLATE, AND PROCESS FOR PRODUCTION THEREOF

[75] Inventors: Kunihiro Ichimura, Yokohama; Norio Ishizuki; Junji Toda, both of Yono, all of Japan

[73] Assignee: Nippon Kayaku Kabushiki Kaisha, Tokyo, Japan

[21] Appl. No.: 428,150
[22] PCT Filed: Sep. 9, 1994
[86] PCT No.: PCT/JP94/01491
§ 371 Date: Apr. 28, 1995
§ 102(e) Date: Apr. 28, 1995
[87] PCT Pub. No.: WO95/07474
PCT Pub. Date: Mar. 16, 1995

[30] Foreign Application Priority Data

Sep. 10, 1993 [JP] Japan .................. 5-248560
Dec. 20, 1993 [JP] Japan .................. 5-344496
Feb. 4, 1994 [JP] Japan .................. 6-032005

[51] Int. Cl.$^6$ .......................................... G02B 5/30
[52] U.S. Cl. ........................... 359/490; 359/63; 359/491
[58] Field of Search ............................. 359/490, 491, 359/492, 63, 98; 430/7, 19

[56] References Cited

U.S. PATENT DOCUMENTS

| | | |
|---|---|---|
| 3,598,582 | 8/1971 | Herrick, Jr. ................. 96/1.5 |
| 4,092,161 | 5/1978 | Radler, Jr. et al. ............. 96/1.5 R |
| 4,865,668 | 9/1989 | Goepfert et al. ............... 156/74 |
| 5,251,065 | 10/1993 | Uetsuki ...................... 359/454 |

FOREIGN PATENT DOCUMENTS 2-298902 12/1990 Japan .
3-38603 2/1991 Japan .

OTHER PUBLICATIONS

Ichimura, Kunihiro, et al, "Photocontrol of In-plane Aslignment of a Nematic Liquid Crystal by a Photochromic Spiropyran Monolayer Absorbing Linearly Polarized Light," Chemistry Letters, 1992, pp.1063–1066.

Polymer Preprints, Japan (English Edition), vol. 42, No. 1 (1993), No. I–10–11 and No. I–10–12.

Primary Examiner—Timothy P. Callahan
Assistant Examiner—T. T. Lam
Attorney, Agent, or Firm—Nields, Lemack & Dingman

[57] ABSTRACT

A polarizing element or polarizing plate comprising a layer having photoactive molecules and a layer containing dichroic molecules formed in contact with said layer, which can easily be produced without a stretching procedure so as to have a complicated pattern, a curved surface or a large area; and a process for producing said polarizing element or polarizing plate which is characterized by irradiating a layer having photoactive molecules on a substrate with linear polarized light, and then forming a dichroic molecular layer on the irradiated layer.

13 Claims, 2 Drawing Sheets

POLARIZING ELEMENT, POLARIZING PLATE, AND PROCESS FOR PRODUCTION THEREOF

TECHNICAL FIELD

The present invention relates to a polarizing element, a polarizing plate and a process for production thereof which are novel.

BACKGROUND ART

Polarizing elements used in liquid crystal display devices, sunglasses, goggles, etc. are produced by a process in which dichroic molecules are dissolved in or adsorbed on a high-molecular weight substance such as a poly(vinyl alcohol), and the resulting film is stretched in one direction to align the dichroic molecules. They are produced also by a process in which dichroic molecules are adsorbed on a uniaxially stretched polymer film. However, the axis of polarization of the polarizing element obtained by any of these processes is fixed in one direction, and only a flat polarizing element can be produced by these processes. For producing various display elements including liquid crystal display elements, there are requested a polarizing element having polarizing properties in optional directions to show a fine pattern and a polarizing element having a curved surface.

For this purpose, there has been proposed a process comprising subjecting the surface of glass or a polymer film to rubbing treatment, i.e., rubbing with cloth, paper or the like in one direction, and then adsorbing dichroic molecules on the surface (see J. F. Dreyer, J. Phys. Colloid Chem., p. 52, 808 (1948)). According to this process, the dichroic molecules are aligned in a direction determined by the rubbing direction. Therefore, a multi-axial polarizing element having axes of polarization in various directions can be produced as a single polarizing plate by subjecting the substrate surface to the rubbing treatment in different directions previously (see J. F. Dreyer, C. W. Ertel, Glass Industry, p. 29, 197 (1948), and Toshiaki Nose, Rumiko Yamaguchi and Susumu Sato, Collection of Papers in Japan Electronic Intelligence Society, J71-C, 1188 (1988)). However, in this production process of a polarizing element by the rubbing treatment, each of masks which can give patterns different in axis of polarization is placed on the substrate to be surface-treated, and only the area not covered with the mask is mechanically rubbed. Therefore, fine patterns different in axis of polarization cannot be drawn. In addition, such a process cannot be employed in the case of a gradation display pattern of photography, etc. or a complicated pattern. Furthermore, in the rubbing treatment of polymer surface, static electricity generated by rubbing causes adsorption of fine dust, so that the surface is soiled. Thus, a method for controlling axis of polarization precisely and finely in an optional direction has not yet been reported.

On the other hand, for producing a polarizing element or polarizing plate having a curved surface, such as sunglasses and goggles for skiing, it has been necessary to process a flat polarizing element by application of heat or force. Moreover, a polarizing element or polarizing plate of high grade has been very expensive because an operation such as encapsulation with a resin or cladding is necessary.

DISCLOSURE OF THE INVENTION

An object of the present invention is to provide a polarizing element or polarizing plate which does not require stretching of a polymer film and permits drawing of a very fine polarization pattern, and a process for producing the polarizing element or polarizing plate.

The present inventors earnestly investigated for achieving the above object, and consequently found that when a photoactive molecular layer capable of easily undergoing a molecular axis change caused by linear polarized light is formed on a substrate and irradiated with linear polarized light in a wavelength range in which the molecular layer absorbs the linear polarized light, and then a dichroic molecular layer is formed on the photoactive molecular layer, dichroic molecules are anisotropically aligned.

BRIEF DESCRIPTION OF THE DRAWINGS

In FIG. 1, (a) shows a film roll, (b) a tray for polymer solution, (c) an immersion roll, and (d) a wind-up roll.

In FIG. 2, (a) shows a film roll, (b) an ulatrahigh-pressure mercury lamp, (c) a polarizing element, and (d) a wind-up roll.

In FIG. 3, (a) shows a film roll, (b) a tray for aqueous dichroic molecules solution, (c) a gravure roll, and (d) a wind-up roll.

BEST MODE FOR CARRYING OUT THE INVENTION

The present invention has been accomplished on the basis of the finding that when a molecular layer capable of easily undergoing a molecular axis change caused by linear polarized light, i.e., a photoactive molecular layer is formed on a substrate and irradiated with linear polarized light in a wavelength range in which the molecular layer absorbs the linear polarized light, and then a dichroic molecular layer is formed on the photoactive molecular layer, dichroic molecules are anisotropically aligned. In detail, the present invention relates to:

(1) a polarizing element or polarizing plate having a layer having photoactive molecules and a layer containing dichroic molecules formed in contact with said layer, (2) a polarizing element or polarizing plate according to the above item (1), wherein the layer having photoactive molecules is formed on a substrate, and a protective layer is formed on the layer containing dichroic molecules, (3) a polarizing element or polarizing plate according to the above item (1) or (2), wherein the photoactive molecules are molecules containing at least one double bond selected from non-aromatic C=C, non-aromatic C=N and non-aromatic N=N, (4) a polarizing element or polarizing plate according to the above item (1) or (2), wherein the dichroic molecules are in a solid state, (5) a polarizing element or polarizing plate according to the above item (1) or (2), wherein the dichroic molecules are those of a compound having a hydrophilic substituent, (6) a polarizing element or polarizing plate according to the above item (5), wherein the hydrophilic substituent is a sulfonic acid group, an amino group or a hydroxyl group, (7) a polarizing element or polarizing plate according to the above item (2), wherein the substrate is flat or has a curved surface, (8) a process for producing a polarizing element or polarizing plate, characterized by irradiating a layer having photoactive molecules on a substrate with linear polarized light, and then forming a layer containing dichroic molecules on the photoactive molecular layer, (9) a process for producing a polarizing element or polarizing plate according to the above item (8), characterized in that the layer having photoactive molecules on the substrate is subjected to corona discharge treatment or ultraviolet irradiation treatment, (10) a gradation display polarizing element or polarizing plate having a layer having photoactive molecules and a layer containing dichroic molecules formed in contact with said layer, (11) a process for producing a gradation display polarizing element or polarizing plate, characterized by irradiating a layer having photoactive molecules on a substrate with linear polarized light through a mask composed of portions different in depth of color, and then forming a layer containing dichroic molecules on the photoactive molecular layer, (12) a multi-axial polarizing element or polarizing plate having a layer having photoactive molecules and a layer containing dichroic molecules formed in contact with said layer, (13) a process for producing a multi-axial polarizing element or polarizing plate, characterized by irradiating a layer having photoactive molecules on a substrate with two or more kinds of linear polarized lights having different axes of rotation, and then forming a layer containing dichroic molecules on the photoactive molecular layer, and

(14) a stereoscopic display polarizing element or polarizing plate having a layer having photoactive molecules and a layer containing dichroic molecules formed in contact with said layer.

As the substrate used in the present invention, any substrate may be used so long as photoactive molecules can be attached thereto or applied thereon. There are used, for example, glass plates of silica glass, hard glass, etc.; quartz plates; plastic plates and sheets (films) of various materials such as ABS resins, acetal resins, (meth)acrylic resins, cellulose acetates, chlorinated polyethers, ethylenevinyl acetate copolymers, fluororesins, ionomers, methylpenetene polymers, nylons, polyamides, polycarbonates, polyesters [e.g. poly(ethylene terephthalate)s and poly(butylene terephthalate)s], polyimides, polyphenylene oxides, polyphenylene sulfides, poly(allyl sulfone)s, polyarylates, polyethylenes, polypropylenes, polystyrenes, polysulfones, vinyl acetate resins, vinylidene chloride resines, AS resins, vinyl chloride resins, alkyd resins, allyl resins, amino resins, urea resins, melamine resins, epoxy resins, phenolic resins, unsaturated polyester resins, silicone resins, polyurethanes, etc.; and products obtained by coating the surface of the glass plate, the quartz plate, or the plastic plate or sheet (film) with a metal oxide (e.g. silicon oxide, tin oxide, indium oxide, aluminum oxide, titanium oxide, chromium oxide or zinc oxide), silicon nitride, silicon carbide or the like. There can also be used substrates (films) whose surface has been coated with a metal thin film having a high reflectivity. The above-exemplified substrates may be either flat ones or ones which have a curved surface.

The photoactive molecules used in the present invention refer to molecules in which a molecular axis orientation change is caused by linear polarized light. The term "molecular axis orientation change" used here means a phenomenon that the direction of molecular axis is changed by absorption of the energy of linear polarized light. As the photoactive molecules for this purpose, there are effectively used molecules containing at least one double bond selected from C=C, C=N and N=N which is non-aromatic. The wavelength of light absorbed by the photoactive molecules include not only that in the visible light region but also that in the region of ultraviolet rays and infrared rays which are not visually observable. When a layer of the photoactive molecules is irradiated with linear polarized light having a wavelength range where the molecules absorbs the linear polarized light, a molecular axis orientation change is easily caused.

The molecular axis orientation change phenomenon caused by the irradiation with linear polarized light is explained as follows. That is, the following is well known. In the ground state of ethylene, i.e., the simplest molecule having a non-aromatic double bond, two carbon atoms and four hydrogen atoms are on the same plane. On the other hand, in a light-excited state, planes formed by two H—C—H atomic groups form a twisted structure in which the planes intersect each other at right angles. It is conjectured that in a light-excited state, the photoactive molecules used in the present invention lose planeness brought about by the above-mentioned double bond(s) and that a molecular axis orientation change is caused in the course of return to ground state via a twisted structure formed by the loss of the planeness. Therefore, the molecular axis orientation change proceeds without a forced molecular structure change due to geometrical isomerization by irradiation with light. For example, it is well known that many of azobenzene type compounds having one or more non-aromatic N=N bonds undergo geometrical photoisomerization from trans-form to cis-form by ultraviolet rays, but hardly undergo geometrical photoisomerization by light having a longer wavelength because conversion from cis-form to trans-form is preferential in the case of such light. It is also known that in some cases, no geometrical photoisomerization is substantially observed because the conversion from cis-form to trans-form takes place thermally and rapidly. A compound having one or more non-aromatic C=N bonds can become a geometrical isomer on irradiation with light but returns to its thermodynamically stable original structure because of the unstability of the isomer. Therefore, the compound does not undergo substantial photoisomerization at, for example, room temperature. In addition, many of compounds having one or more non-aromatic C=C bonds undergo geometrical photoisomerization, but like azobenzene, they do not undergo substantial geometrical isomerization by light in a wavelength range suitable for isomerization from cis-form to trans-form. However, even in such a case where no photoisomerization reaction takes place seemingly, a molecular axis orientation change is easily caused by irradiation with linear polarized light. Therefore, compounds having such properties can also be used as the photoactive molecules used in the present invention.

Specific examples of the photoactive molecules used in the present invention are given below. As compounds having one or more non-aromatic N=N bonds, there are exemplified aromatic azo compounds such as azobenzene, azonaphthalene, bis-azo compounds, formazane, etc., and compounds of azoxybenzene basic skeleton. Examples of such compounds are given below but the compounds are not limited thereto.

As compounds having one or more non-aromatic C=N bonds, aromatic Schiff bases and aromatic hydrazones can be exemplified. Examples of them are given below but the compounds are not limited thereto.

As compounds having one or more non-aromatic C=C bonds, there can be exemplified polyenes, stilbene, stilbazole, stilbazolium, cinnamic acid, indigo, thio-indigo and hemithioindigo. Examples of them are given below but the compounds are not limited thereto.

-continued

In the present invention, there can also be used compounds which do not undergo substantial photoisomerization reaction by irradiation with light at room temperature because they return to their original structures immediately owing to the unstability of their geometrical photoisomers, and compounds which do not undergo geometrical photoisomerization reaction at all. The following cyanines and merocyanines are exemplified but the above-mentioned compounds are not limited thereto.

In addition, there can be used other photoactive molecules which are those of compounds having a non-aromatic C=C bond or C=N bond in spiro ring and is reversibly changed in molecular structure by irradiation with light, for example, the spiropyrans and spirooxazines described below. These photoactive molecules have a molecular structure different from the above-mentioned molecular structure, but it can be speculated that owing to the non-aromatic C=C bond or C=N bond contained in the molecule, reversible ring-opening and ring-closing reactions of the spiro ring are caused by the action of light, so that a molecular axis orientation change is caused.

The above photoactive molecules are exemplified as the basic skeletons of the compounds having the above-mentioned double bond(s). To these skeletons may be attached one or more substituents selected from, for example, alkyl groups such as methyl, ethyl, propyl, butyl, hexyl, etc.; alkoxy groups such as methoxy, ethoxy, propoxy, butoxy, etc.; ally group; allyloxy group; cyano group; alkoxycarbonyl groups such as methoxycarbonyl, ethoxycarbonyl, etc.; hydroxy group; dialkylamino groups such as dimethyl amino, diethylamino, etc.; and nitro group. In particular, as preferable substituents, there are exemplified $C_1$–$C_6$ alkyl groups, $C_1$–$C_6$ alkoxy groups, cyano group and $C_1$–$C_6$ alkoxycarbonyl groups, which give a structure similar to that of a liquid crystal molecule.

In the present invention, in order to form on a substrate a photoactive molecular layer capable of undergoing such a reversible molecular axis orientation change, there are a method of attaching photoactive molecules to the surface of the substrate physically or chemically, depending on surface characteristics of the substrate, and a method of previously preparing a polymer having photoactive molecules attached thereto or a polymer having photoactive molecules incorporated thereinto, and applying any of the polymers in the form of a thin film on the substrate. Any of these methods may be employed. The layers formed by fixing photoactive molecules on the substrate surface, i.e., the layer formed by attaching photoactive molecules to the substrate surface and the layer formed by applying the polymer having photoactive molecules attached thereto on the substrate in the form of a thin film have a stable orientation state of photoactive molecules and hence are preferable.

First, the method of attaching photoactive molecules to the substrate surface is described below. For this purpose, for example, when the substrate is silyl glass, the method employed for liquid crystal orientation can be employed (see J. Cognard "Molecular Crystals and Liquid Crystals", Supplement 1 (1982), p. 1).

As a first method for attaching photoactive molecules to the substrate surface, there is exemplified a method in which a solution in a solvent of photoactive molecules having the above-mentioned non-aromatic double bond(s) and the surface active group described below is applied on the substrate surface to attach the photoactive molecules by adsorption. As the surface active group, there can be exemplified carboxylic acid residues, malonic acid residue, carbamoyl group, tetraalkylammonium groups, alkylpyridinium residues, alkyquinolinium residues, carboxylato chromium residue, ester residues, nitrile residue, urea residue, amino group, hydroxyl group and betaine residue. When the photoactive molecules are liquid, they may be directly applied on the substrate surface.

As a second method, there can be employed the Langmuir-Blodgett technique which comprises spreading photoactive molecules having the above-exemplified surface active group, on water surface in the form of a monolayer, and transfering the monolayer onto a substrate to obtain at least one layer. For this purpose, for example, carboxyl group, carbamoyl group, amino group, ammonium group, tetraalkylammonium groups and hydroxyl group are preferable.

As a third method, there is exemplified a method of attaching photoactive molecules to the substrate surface through a silyl group. Specific examples of this method are a method in which photoactive molecules having a substituted silyl group having at least one halogen atom or alkoxy group as the substituent(s) are attached to the substrate surface; and a method in which photoactive molecules having a carboxyl group or an acryl group are subjected to condensation reaction or addition reaction with the substrate surface which has been treated with a silylating agent having an amino group. In the former method, the silyl group is previously introduced into photoactive molecules and the surface of silica glass is treated with the photoactive molecules. As the substituted silyl group having at least one halogen atom or alkoxy group as the substituent(s), trichlorosilyl group, trimethoxysilyl group and triethoxysilyl group are exemplified. In the latter method, the silylating agent having an amino group includes, for example, aminopropyltrichlorosilane, aminobutyltrichlorosilane, aminopropyltrimethoxysilane and aminopropyltriethoxysilane. The procedure of attaching the photoactive molecules to the substrate surface may be carried out in the presence of another silylating agent. As the silylating agent for this purpose, there can be exemplified alkyl(poly)alkoxysilanes such as methyltriethoxysilane, dimethyldiethoxysilane, trimethylchlorosilane, ethyltriethoxysilane, diethyldiethoxysilane, propyltriethoxysilane, butyltriethoxysilane, butylmethyldiethoxysilane, pentyltriethoxysilane, hexyltriethoxysilane, etc. But, the silylating agent is not limited to them.

A fourth method is as follows. When a high-molecular weight substance forms the substrate itself or the surface layer of the substrate, a photoactive compound having the above-exemplified surface active group is attached to the substrate surface by adsorption, or photoactive molecules are attached to active groups which appear at the polymer surface, by covalent bonds. In the latter case, for example, when the high-molecular weight substance is a poly(vinyl alcohol), photoactive molecules are attached to the surface layer of the substrate by acetal linkages, ester linkages or urethane linkages. For this purpose, photoactive molecules having a covalent-bond-forming group such as formyl group, chloroformyl group or isocyanate group are prepared and then dissolved in a solvent which does not dissolve the poly(vinyl alcohol), and the substrate having a poly(vinyl alcohol) film is immersed in the resulting solution to be subjected to reaction. To increase the treating reaction rate, addition of a catalyst acid such as p-toluenesulfonic acid is sufficient in the case of acetalization, and addition of a base (e.g. triethylamine or pyridine) for removing an acid produced by the reaction is sufficient in the case of esterification or conversion to an urethane.

Next, there is described below the method of previously preparing a polymer having photoactive molecules attached thereto or a polymer having photoactive molecules incorporated thereinto, and applying any of the polymers in the form of a thin film on the substrate. First, a method for preparing the polymer having photoactive molecules attached thereto is explained below. For attaching photoactive molecules to the side chains or principal chain of a polymer, a monomer having photoactive molecules is polymerized, or to a high-molecular weight substance are attached photoactive molecules having a reactive residue suitable for the chemical structure of the substance.

In the former method, i.e., the polymerization method, photoactive molecules having a (meth)acryl group having radical-polymerizability are suitable as the monomer, and a polymer having the photoactive molecules attached to the side chains can easily be obtained by polymerization of the monomer. In the case of a polymer obtained by polycondensation reaction (e.g. a polyester, polyamide or polyimide) or a polymer obtained by polyaddition reaction (e.g. a polyurethane), preparation of a bifunctional monomer having photoactive molecules is sufficient. As the bifunctional monomer, vinyl cinnamate is exemplified. The polymeric compound having photoactive molecules attached thereto which is obtained by polymerization may be either a homopolymer obtained by polymerizing only a monomer having photoactive molecules, or a copolymer obtained by polymerizing a monomer having photoactive molecules and another monomer. The other monomer includes, for example, methyl (meth)acrylate, ethyl (meth)acrylate, butyl (meth)acrylate and 2-ethylhexyl (meth)acrylate. The amount of photoactive molecules attached in the polymer can be adjusted by changing the using ratio of the monomer having photoactive molecules to the other monomer. Although depending on the structures of the monomers, the using ratio ranges from 1:0 to 1:100, preferably from 1:0 to 1:50.

In the later method in which to a high-molecular weight substance are attached photoactive molecules having a reactive residue suitable for the chemical structure of the substance, the above-mentioned fourth method can be utilized. As the polymer used, there can be exemplified poly(vinyl alcohol)s, styrenemaleic anhydride copolymers, poly(glycidyl methacrylate)s, and copolymers thereof. But, the polymer is not limited to them.

As a method for forming a thin film of such a polymer having photoactive molecules in the principal chain or the side chains, on the substrate surface, a spin coating technique is preferable. It is also possible to form such a polymer on the substrate by the Langmuir-Blodgett technique. In addition, the substrate may be immersed in a solution of such a polymer to adsorb the polymer on the substrate. As the film thickness, 1 μm or less is sufficient.

The method using a polymer having photoactive molecules incorporated thereinto is explained below. This method comprises dissolving or uniformly dispersing photoactive molecules in a polymer previously, and applying the resulting solution or dispersion on the substrate surface in the form of a thin film. In this case, the polymer and the photoactive molecules should be insoluble in a solvent used in the solution of dichroic molecules described hereinafter. For example, polyimides are preferable as the polymer because they are insoluble particularly in solvents such as water and alcohols, but the polymer is not limited to them.

Next, the procedure of irradiating the photoactive molecular layer formed on the substrate with linear polarized light is explained below. The wavelength of the polarized light used for the irradiation is not particularly limited so long as it is a wavelength at which photoactive molecules absorb the polarized light. For example, not only visible light but also light in the ultraviolet and infrared region may be used. As a light source, there may be used any of a mercury lamp, xenon lamp, fluorescent lamp, chemical lamp, helium-cadmium laser, argon laser, krypton laser, herium-neon laser, semiconductor laser, sunlight, etc. The light source may be chosen depending on the absorption wavelength region of photoactive molecules, light irradiation time, irradiation area, etc. To obtain linear polarized light, it is sufficient that light from the above-exemplified light source is combined with a polarizing element for linear polarized light or a polarizing plate for linear polarized light. As the polarizing element or polarizing plate for this purpose, there are exemplified prism type elements such as Glan-Thompson prism, and polarizing elements and polarizing plates, which are made of a polymer film obtained by dissolution or adsorption of dichroic molecules, followed by stretching. In addition, a polarizing element (plate) produced according to the present invention can also be used. Although the exposure energy of the linear polarized light used here is varied depending on the wavelength, the structure and attachment state of photoactive molecules, the irradiation temperature, etc., it is preferably in the range of 1 mJ/cm$^2$ to 10 mJ/cm$^2$. When a laser is used as a light source, no polarizing element (plate) is needed when laser beam itself is linear polarized light.

To bake a polarization pattern on the photoactive molecular layer, it is sufficient that the photoactive molecular layer is irradiated with linear polarized light through a desired mask pattern. Either an enlarged pattern or a very fine pattern can be obtained by divergence or condensation, respectively, of linear polarized light by the use of a lens or the like. When a laser is used as a light source and laser beam itself is linear polarized light, a very fine pattern can be freely drawn by combining the laser with an element for rotating plane of polarization, such as Faraday element. Furthermore, since a molecular axis orientation change of photoactive molecules caused by linear polarized light is reversible, patterns can be freely drawn so as to be placed one upon another, by irradiation of linear polarized lights different in axis of polarization for different mask patterns. After production of a polarizing element (plate) having a complicated pattern, employment of this polarizing element (plate) as a mask pattern makes it possible to produce a large number of polarizing elements (plates) having a complicated pattern which have been difficult to produce, by irradiation with linear polarized light which is a simple method.

It is surprising that mere adsorption of dichroic molecules on the thus obtained photoactive molecular layer in which molecular axes are aligned in a definite direction, i.e., mere formation of a dichroic molecular layer on the photoactive molecular layer aligns the molecular axes of the dichroic molecules in the direction of alignment of photoactive molecules, i.e., the direction determined by the axis of polarization of linear polarized light casted on the photoactive molecular layer, and permits exhibition of properties of a polarizing element (plate) by fixation of its axis of polarization. In conventional methods, it is conjectured that when the surface of glass or a polymer film is subjected to rubbing treatment, dye molecules are aligned along fine grooves formed on the surface. However, in the present invention, the alignment of photoactive molecules per se determines the alignment of dichroic molecules adsorbed thereon, without the formation of such grooves.

The dichroic molecules used in the present invention are molecules of a compound which exhibits polarizing properties by alignment of the molecules themselves or their aggregates in a definite direction. For example, compounds having an aromatic ring structure are preferable. As the aromatic ring structure, benzene, naphthalene, anthracene, phenanthrene, heterocyclic rings (e.g. thiazole, pyridine, pyrimidine, pyridazine, pyrazine and quinoline), quaternary salts thereof, and fused rings of these compounds and benzene, naphthalene, etc. are particularly preferable. In addition, it is preferable that a hydrophilic substituent such as sulfonic acid group, amino group or hydroxyl group is introduced into these aromatic rings.

As the dichroic molecules, there can be exemplified dye type compounds such as azo dyes, stilbene dyes, pyrazolone dyes, triphenylmethane dyes, quinoline dyes, oxazine dyes, thiazine dyes, anthraquinone dyes, etc. Water-soluble compounds are preferable but the dichroic molecules are not limited to them. In addition, it is preferable that a hydrophilic substituent such as sulfonic acid group, amino group or hydroxyl group is introduced into these dichroic molecules. Specific examples of the dichroic molecules are C.I. Direct Blue 67, C.I. Direct Blue 90, C.I. Direct Green 59, C.I. Direct Violet 48, C.I. Direct Red 39, C.I. Direct Red 79, C.I. Direct Red 81, C.I. Direct Red 83, C.I. Direct Red 89, C.I. Direct Orange 39, C.I. Direct Orange 72, C.I. Acid Red 37, and the dyes described in JP-A-1-161202, JP-A-1-172906, JP-A-1-172907, JP-A-1-183602, JP-A-1-248105 and JP-A-1-265205. The structures of typical dyes among these dyes are shown below.

C.I. Direct Blue 67

C.I. Direct Orange 72

C.I. Direct Red 83

C.I. Direct Green 59

C.I. Direct Violet 48

C.I. Acid Red 37

A method for anisotropic adsorption of the dichroic molecules on the photoactive molecular layer on the substrate irradiated with linear polarized light is explained below. One compound selected from the above-mentioned dichroic molecules or a mixture of two or more compounds selected therefrom is dissolved in a hydrophilic solvent such as water, methanol or ethanol, or an aqueous solvent thereof. The concentration is preferably approximately 0.1–10 w/w %, more preferably approximately 0.5–5 w/w %. A surfactant may be added to the resulting solution. As the surfactant, any of cationic surfactants, nonionic surfactants and anionic surfactants can be used, though the nonionic surfactants are preferable. Then, the dichroic molecules solution is dropped on the substrate surface, after which a layer of dichroic molecules with a uniform thickness is formed by means of a coater or by a spin-coating technique. Alternatively, the substrate having the photoactive molecular layer irradiated with linear polarized light is immersed in the dichroic molecules solution and then pulled up. For attaining a uniform concentration of dichroic molecules, it is preferable to keep the pulling-up rate constant. The thickness of the dichroic molecular layer is preferably small from the viewpoint of improvement in polarizing characteristics and is preferably, for example, 10 μ or less, particularly preferably 0.1 to 2 μ.

The substrate having the dichroic molecules solution attached thereto is dried to form the dichroic molecular layer in a solid state, whereby the polarizing element (plate) of the present invention is obtained. Although the drying conditions are varied depending on the kind of the solvent, the kind of the dichroic molecules, the volume of the dichroic molecules solution applied, the concentration of the dichroic molecules, etc., the temperature is room temperature to 100° C., preferably room temperature to 50° C. The humidity is 20 to 80% RE, preferably approximately 30 –70% RH.

The dichroic molecular layer thus prepared by anisotropic adsorption is in a solid state, for example, amorphous state or crystaline state and is usually poor in mechanical strength. Therefore, a protective layer is formed on the surface of the dichroic molecular layer. The protective layer is usually formed by a covering method such as coating of the dichroic molecular layer with an ultraviolet-curable or heat-curable, transparent polymer film, or lamination of a transparent polymer film such as a polyester film or cellulose acetate film on the dichroic molecular layer.

When the polarizing element (plate) of the present invention is produced, its polarizing characteristics can be further improved by subjecting the photoactive molecular layer to corona discharge treatment or ultraviolet irradiation. The corona discharge treatment is carried out on the photoactive molecular layer preferably before the irradiation with linear polarized light. But the time of the corona discharge treatment is not particularly limitd to before the irradiation. As an equipment for the corona discharge treatment, various commercially available corona discharge treatment machines can be used. Although the corona discharge treatment conditions are varied depending on conditions such as the kind of the substrate on which the photoactive molecular layer is formed, the composition and thickness of the photoactive molecular layer, and the composition and thickness of the dichroic molecular layer applied after the corona discharge treatment, the energy density is 20–400 W.min.m$^{-2}$, preferably approximately 50–300 W.min.m$^{-2}$, per treating operation. When 1 time of the treatment is not sufficient, the treatment may be carried out twice or more. The ultraviolet irradiation is carried out on the photoactive molecular layer preferably before the irradiation with linear polarized light. But the time of the ultraviolet irradiation is not particularly limited to before the irradiation with linear polarized light. Although the wavelength of ultraviolet rays used is not particulary limited, far ultraviolet rays of 300 nm or less, for example, are preferable. The ultraviolet irradiation is preferably carried out in an oxygen stream. As an equipment for the ultraviolet irradiation, various commercially available ultraviolet irradiations can be used. Although the ultraviolet irradiation conditions are varied depending on conditions such as the kind of the substrate on which the photoactive molecular layer is formed, the composition and thickness of the photoactive molecular layer, and the composition and thickness of the dichroic molecular layer applied after the ultraviolet irradiation, at most about several minutes is sufficient as the irradiation time.

In the case of the polarizing element (plate) of the present invention, a polarizing layer having an optional axis can be formed on any curved surface without applying an external stress. For example, a polarizing element (plate) such as polarizing sunglasses or goggles which have an optional axis of polarization can be produced by forming the photoactive molecular layer used in the present invention, on the curved surface of sunglasses or goggles, irradiating the photoactive molecular layer with linear polarized light, and then forming a dichroic molecular layer thereon.

To the polarizing element (plate) of the present invention, a gradation due to variation of the depth of color of the polarizing element (plate) itself or a pattern having a large number of axes of polarization can be given during the production of the polarizing element (plate). A gradation display polarizing element (plate) having a gradation can be produced by utilizing linear polarized light passed through a mask pattern composed of portions different in depth of color or a photographic negative at the time of baking a polarization pattern on a photoactive molecular layer. A multi-axial polarizing element (plate) having a large number of axes of polarization can be produced by irradiating different areas of a photoactive molecular layer with linear polarized lights different in axis of polarization, at the time of baking a polarization pattern on the photoactive molecular layer.

A stereoscopic display polarizing element (plate) can be produced using the polarizing element (plate) of the present invention. The term "stereoscopic display" means three-dimensional expression of a two-dimensional photograph, drawing, picture, etc. by a special method. The special method includes, for example, a method of looking at a matter printed in red and blue through glasses composed of left and right lenses colored in red and blue, respectively, and a method of obtaining a three-dimensional image by shifting the focus of eyes. There is also a method of obtaining a three-dimensional projected image by passing an image obtained by means of a polarizing projector, through a polarizing element (plate) having different axes of polarization in its left and right portions, respectively. But, there is no method of obtaining a three-dimensional image by looking at a polarizing element (plate) on a plane through another polarizing element (plate). For displaying a figure or a pattern, it is necessary to impart polarizing characteristics to only a certain restricted region or give two or more axes of polarization on one plane. Since the polarizing element (plate) of the present invention permits drawing of fine patterns whose axes of polarization are the same or different, said polarizing element (plate) is suitable for producing a stereoscopic display polarizing element (plate). For producing the stereoscopic display polarizing element (plate), polarizing elements (plates) for left eye and right eye, respectively, are necessary. To produce each of these polarizing elements (plates), it is sufficient that a polarization pattern is baked on a photoactive molecular layer by exposure to linear polarized light through a desired mask pattern or photographic negative. In this case, when linear polarized light for left eye and that for light eye are made different in axis of polarization, polarizing elements (plates) corresponding to the axes of polarization, respectively, can be produced. The angle between the axes of polarization is preferably, for example, ±45°, ±90° or ±135°. The stereoscopic display polarizing element (plate) can be produced by putting the aforesaid polarizing elements (plates) side by side at a definit distance from each other or placing them one upon another. When there are used a mask for left eye and a mask for right eye which have been produced by the use of fine dots, an image for left eye and an image for right eye which are different in axis of polarization can be baked on a polarizing element (plate).

EXAMPLES

The present invention including synthetic methods of compounds having photoactive molecules is more concretely illustrated below with examples, but the present invention is not limited by these examples. In the examples, parts are all by weight unless otherwise specified. The polarization rate was calculated by the following calculation equation:

Polarization rate (%)=$\{(Y_2-Y_1)/(Y_2+Y_1)\}^{1/2} \times 100$ ($Y_2$:parallel transmittance (%),
$Y_1$:orthogonal transmittance (%)).

Example 1

4-Methacryloyloxyazobenzene is dissolved in benzene to obtain a 20 wt % solution, and the solution is subjected to polymerization with deaeration at 60° C. for 12 hours by using azobisisobutylonitrile as an initiator. A solution consisting of 10 parts of the resulting polymer having azobenzene and 90 parts of toluene is spin-coated on hard glass. This substrate is dried by heating at 105° C. for 10 minutes.

A 500 W/h ultrahigh-pressure mercury lamp is used as a light source, and light therefrom is converted to visible light (>400 nm) by means of a cut off filter and then passed through a polarizing plate to be converted to linear polarized light. The coated surface of the aforesaid substrate placed in parallel with the axis of polarization of the polarizing plate is irradiated with the linear polarized light from a distance of 50 cm at room temperature for 1 minute.

To 10 parts of C.I. Direct Blue 67 is added 1 part of Emalgen 108 (a nonionic surfactant, mfd. by Kao Corp.) and the resulting mixture is diluted with 89 parts Of distilled water to obtain an aqueous solution. This aqueous dye solution is spin-coated on the surface irradiated with the linear polarized light of the aforesaid substrate and then dried under conditions of 25° C. and 50% RH to obtain a polarizing element (plate) of the present invention.

When this substrate is observed through a polarizing plate, a contrast between light and darkness appears. When the polarizing plate is turned, light and darkness are reversed every 90°, namely, the substrate shows the same behavior as that of a conventional polarizing plate. The single-plate transmittance at each wavelength and average single-plate transmittance (Ys: the average of single-plate transmittance values at individual wavelengths) of the polarizing element (plate), and the transmittance, polarization rate and average polarization rate (ρ: the average of polarization rate values at individual wavelengths) which are attained when the axes of polarization of two of the polarizing elements (plates) are parallel ($Y_2$) or rectangular ($Y_1$) to each other are as follows.

TABLE 1

| Wavelength (nm) | Single plate (%) | Transmittance Parallel (%) | Rectangular (%) | Polarization rate (%) |
| --- | --- | --- | --- | --- |
| 400 | 57.48 | 42.14 | 33.13 | 34.55 |
| 420 | 61.39 | 41.60 | 31.02 | 38.23 |
| 440 | 60.36 | 39.88 | 26.10 | 45.58 |
| 460 | 57.49 | 37.44 | 17.81 | 59.54 |
| 480 | 52.55 | 35.38 | 9.53 | 75.80 |
| 500 | 47.37 | 34.39 | 4.85 | 86.72 |
| 520 | 44.20 | 33.17 | 2.77 | 91.97 |
| 540 | 42.47 | 32.52 | 2.06 | 93.83 |
| 560 | 41.40 | 32.15 | 2.11 | 93.64 |
| 580 | 41.84 | 32.14 | 2.83 | 91.54 |
| 600 | 43.23 | 33.09 | 4.42 | 87.38 |
| 620 | 45.71 | 34.38 | 7.39 | 80.34 |
| 640 | 49.78 | 36.31 | 12.96 | 68.86 |

TABLE 1-continued

| Wavelength (nm) | Single plate (%) | Transmittance Parallel (%) | Rectangular (%) | Polarization rate (%) |
| --- | --- | --- | --- | --- |
| 660 | 54.55 | 39.02 | 20.51 | 55.72 |
| 680 | 58.85 | 41.93 | 27.17 | 46.20 |
| 700 | 63.48 | 45.79 | 34.82 | 36.74 |
| Average | 51.38 | — | — | 67.92 |

Example 2

4-Methacryloyloxyazobenzene and methyl methacrylate are dissolved in benzene in the ratio of 1:9 to obtain a 20 wt % solution, and the solution is subjected to polymerization in the same manner as in Example 1. A solution consisting of 10 parts of the resulting polymer and 90 parts of toluene is spin-coated on hard glass, dried by heating at 105° C. for 10 minutes, and then irradiated with linear polarized light in the same manner as in Example 1. Then, an aqueous dye solution obtained by mixing 5 parts of C.I. Direct Blue 67 with 5 parts of C.I. Direct Orange 72, and adding thereto 1 part of Emalgen 108, followed by dilution with 89 parts of distilled water is spin-coated on the surface irradiated with linear polarized light and then dried under conditions of 25° C. and 50% RE to obtain a polarizing element (plate) of the present invention. The single-plate transmittance at each wavelength and average single-plate transmittance of the polarizing element (plate), and the transmittance, polarization rate and average polarization rate which are attained when the axes of polarization of two of the polarizing elements (plates) are parallel or rectangular to each other are as follows.

TABLE 2

| Wavelength (nm) | Single plate (%) | Transmittance Parallel (%) | Rectangular (%) | Polarization rate (%) |
| --- | --- | --- | --- | --- |
| 400 | 37.58 | 21.24 | 7.03 | 70.83 |
| 420 | 35.99 | 20.20 | 5.58 | 75.29 |
| 440 | 35.86 | 20.48 | 5.15 | 77.28 |
| 460 | 36.49 | 21.54 | 4.98 | 78.97 |
| 480 | 36.75 | 22.38 | 4.57 | 81.26 |
| 500 | 37.07 | 23.29 | 4.18 | 83.34 |
| 520 | 37.30 | 23.97 | 3.92 | 84.72 |
| 540 | 37.37 | 24.12 | 3.70 | 85.66 |
| 560 | 37.80 | 24.85 | 3.75 | 85.87 |
| 580 | 38.84 | 26.04 | 4.13 | 85.19 |
| 600 | 40.23 | 27.59 | 4.78 | 83.88 |
| 620 | 42.01 | 29.38 | 5.87 | 81.65 |
| 640 | 44.88 | 31.91 | 8.19 | 76.88 |
| 660 | 48.69 | 35.02 | 12.26 | 69.39 |
| 680 | 52.65 | 38.33 | 16.88 | 62.34 |
| 700 | 57.28 | 42.39 | 23.05 | 54.28 |
| Average | 41.05 | — | — | 77.30 |

Example 3

A methacrylic ester polymer having benzylidene-aniline in the side chains is synthesized in the same manner as in Example 1, and a solution consisting of 10 parts of the polymer and 90 parts of toluene is spin-coated on hard glass and dried by heating at 105° C. for 10 minutes. The coated surface of the substrate is irradiated with linear polarized light obtained by combining a cut off filter (>340 nm) and polarizer with light from ultrahigh-pressure mercury lamp. Then, a dye solution is applied and then dried in the same manner as in Example 2 to obtain a polarizing element (plate) of the present invention.

Example 4

Production of a polarizing element (plate) using a polymer film having stilbene A methacrylic ester polymer having 6-hexyloxy-stilbene in the side chains is synthesized, and a solution consisting of 10 parts of the polymer and 90 parts of toluene is spin-coated on hard glass and dried by heating at 105° C. for 10 minutes. Irradiation with linear polarized light is carried out in the same manner as in Example 3, after which a dye solution is applied and then dried in the same manner as in Example 2 to obtain a polarizing element (plate) of the present invention.

Example 5

Synthesis of of a polarizing element using a polymer film having spiropyran

A methacrylic ester polymer having 6-nitroindolinospirobenzopyran in the side chains is synthesized, and a solution consisting of 10 parts of the polymer and 90 parts of toluene is spin-coated on hard glass and dried by heating at 105° C. for 10 minutes. The coated surface of the substrate is irradiated with linear polarized light in the same manner as in Example 3, after which a dye solution is applied and then dried in the same manner as in Example 2 to obtain a polarizing element (plate) of the present invention.

Example 6

Polarizing element (plate) using a poly(vinylidene fluoride) film

A solution consisting of 0.1 part of the same polymer containing azobenzene as used in Example 1 and 99.9 parts of toluene is spin-coated on a poly(vinylidene chloride) film and dried by heating at 105° C. for 10 minutes. In the same manner as in Example 1, this substrate is irradiated with linear polarized light, coated with a dye solution, and then dried under conditions of 25° C. and 50% RH, after which a poly(ethylene terephthalate) film is laminated on the coated surface to obtain a polarizing element (plate) of the present invention.

Example 7

Gradation display polarizing element (plate)

A solution consisting of 10 parts of the same polymer having azobenzene groups as obtained in Example 1 and 90 parts of toluene is spin-coated on hard glass and dried by heating at 105° C. for 10 minutes. A mask pattern with stepwise contrast variation is placed on the coated surface of the substrate, and the coated surface is irradiated with linear polarized light obtained by combining a cut off filter (>340 nm) and polarizer with light from ultrahigh-pressure mercury lamp, through the mask pattern from a distance of 50 cm at room temperature for 1 minute. A dye solution is applied and then dried in the same manner as in Example 1 to obtain a polarizing element (plate) of the present invention. When this element is observed through a separately produced polarizing plate, there is obtained an image having a stepwise contrast which corresponds to the mask pattern. When the polarizing plate is turned, an image wherein light and darkness have been reversed is obtained every 90°.

Example 8

Gradation display polarizing element (plate)

A solution consisting of 10 parts of the same polymer having azobenzene groups as obtained in Example 1 and 90 parts of toluene is spin-coated on hard glass and dried by heating at 105° C. for 10 minutes. A photographic negative is placed on the above-mentioned substrate, followed by irradiation with polarized light of visible rays obtained in the same manner as in Example 1, from a distance of 50 cm at room temperature for 1 minute. A dye solution is applied and then dried in the same manner as in Example 1 to obtain a polarizing element (plate) of the present invention. When this substrate is observed through a separately produced polarizing plate, there is obtained an image corresponding to the photographic negative. When the polarizing plate is turned 90°, light and darkness are reversed, whereby a positive image is obtained.

Example 9

Multi-axial polarizing element (plate)

A triacetyl cellulose film is immersed in a solution consisting of 1 part of the same polymer having azobenzene groups as obtained in Example 1 and 99 parts of toluene and pulled up. After natural drying in the air, the above-mentioned substrate placed in parallel with the axis of polarization of a polarizing plate is irradiated with linear polarized light obtained in the same manner as in Example 1, from a distance of 50 cm at room temperature for 1 minute. Next, the axis of polarization is turned 90°, after which a mask pattern is placed on the aforesaid substrate, followed by irradiation with polarized light of visible rays from a distance of 50 cm at room temperature for 1 minute. The same aqueous violet dye solution as in Example 1 is spin-coated on the aforesaid substrate and then dried under conditions of 25° C. and 50% RH to obtain a polarizing element (plate) of the present invention. When this substrate is observed through a separately produced polarizing plate, there is obtained an image with contrast between light and darkness which corresponds to the mask pattern. When the polarizing plate is turned, an image wherein light and darkness have been reversed is obtained every 90°.

Example 10

Multi-axial polarizing element (plate)

A triacetyl cellulose film is immersed in a solution consisting of 1 part of the same polymer having azobenzene groups as obtained in Example 1 and 99 parts of toluene and pulled up. After natural drying in the air, the above-mentioned substrate placed in parallel with the axis of polarization of a polarizing plate is irradiated with linear polarized light obtained in the same manner as in Example 1, from a distance of 50 cm at room temperature for 1 minute. Next, the axis of polarization is turned 45°, after which a striped mask pattern is placed on the right part of the aforesaid substrate and the left part is hidden so as not to be exposed to light, followed by irradiation with polarized light of visible rays from a distance of 50 cm at room temperature for 1 minute. Then, the axis of polarization is turned 45°, after which a geometrically patterned mask pattern is placed on the left part of the aforesaid substrate and the right part is hidden, followed by irradiation with linear polarized light for 1 minute. The same aqueous violet dye solution as in Example 1 is spin-coated on the aforesaid substrate and then dried under conditions of 25° C. and 50% RH to obtain a polarizing element (plate) of the present invention. When this substrate is observed through a separately produced polarizing plate, a striped image is obtained on the right part. When the polarizing plate is turned 45°, the striped image disappears and in place thereof, a geometrically patterned image is obtained on the left part. When the polarizing plate is turned 90°, the geometrically patterned image on the left part disappears and a striped image is obtained as a reverse image on the right part. When the polarizing plate is turned 135°, the striped image on the right part disappears and a geometrically patterned image is obtained as a reverse image on the left part. When the polarizing plate is turned 180°, the geometrically patterned image on the left part disappears and a striped image is obtained on the right part, namely, the same image as the initial image is obtained.

Example 11

Multi-axial polarizing element (plate)

Figure 1:
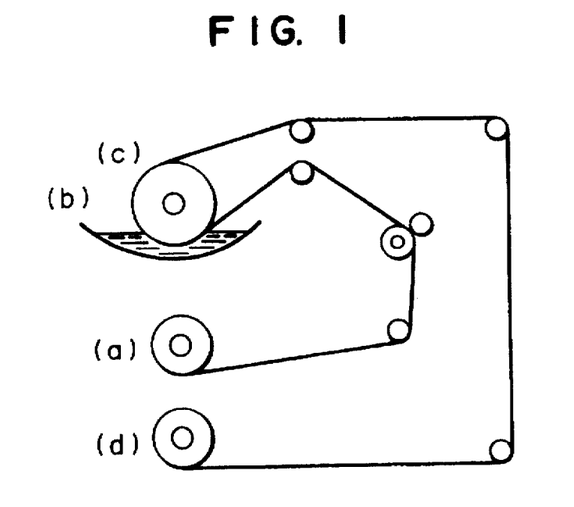
FIG. 1 is a schematic illustration of an equipment for forming a photoactive separate layer.
Figure 2:
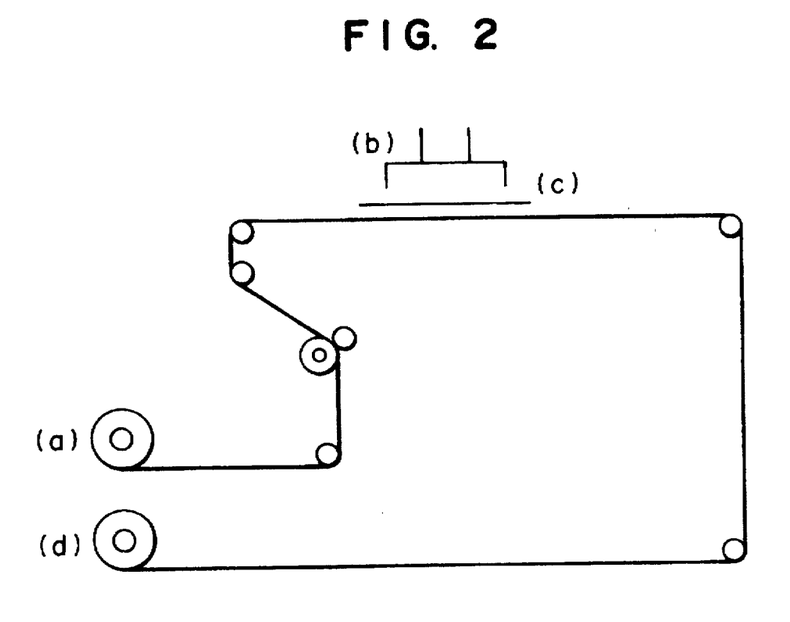
FIG. 2 is a schematic illustration of an irradiator of polarized light of visible rays.
Figure 3:
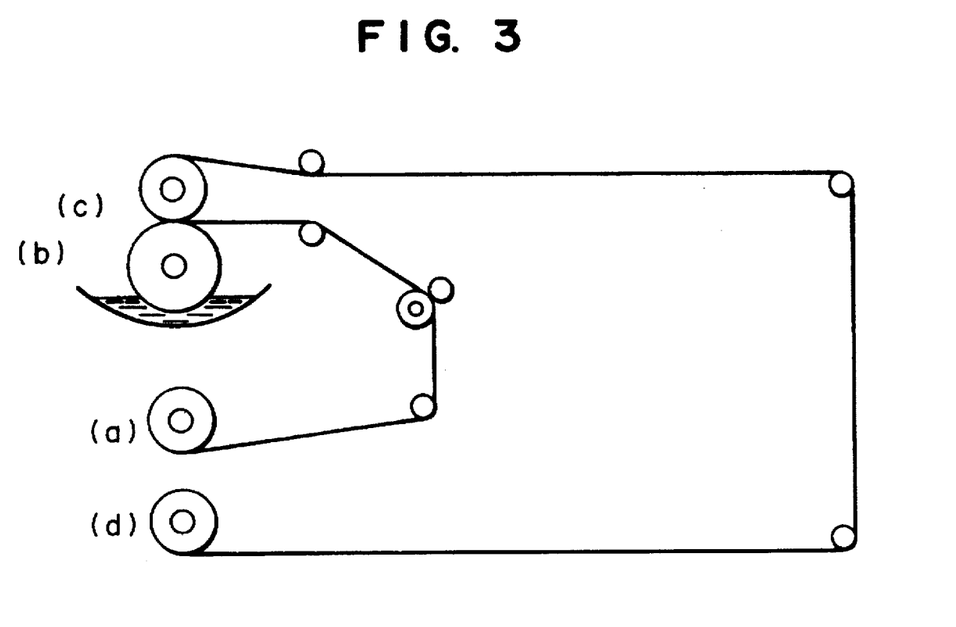
FIG. 3 is a schematic illustration of an equipment for forming a dichroic molecular layer.

A belt-shaped, continuous, multi-axial polarizing element (plate) is produced using the equipments shown in FIG. 1 to FIG. 3. FIG. 1 is a schematic illustration of an equipment for forming a photoactive molecular layer. A triacetyl cellulose film is set on a film roll (a), and an immersion roll (c) is immersed in a polymer solution (consisting of 1 part of the same polymer as obtained in Example 1 and 99 parts of toluene) in a tray (b) while being rotated. The film is air-dried and then wound on a wind-up roll (d).

FIG. 2 is a schematic illustration of an irradiator of polarized light of visible rays. The film having a photoactive molecular layer formed thereon is set on (a), irradiated with polarized light of visible rays obtained by the use of an ultrahigh-pressure mercury lamp (b) and a polarizing plate (c), and then wound on a wind-up roll (d). The polarizing plate (c) can give linear polarized light of 2 cm in width and is used so as to allow the direction of the axis of polarization alternate between parallel direction and perpendicular direction to the side of the film every time the film is moved by 2 cm.

FIG. 3 is a schematic illustration of an equipment for forming a dichroic molecular layer. The film having the photoactive molecular layer formed thereon which has been irradiated with the polarized light is set on (a), followed by transfer onto the film by means of a gravure roll (c) immersed in an aqueous dichroic molecules solution in a tray (b). The film is air-dried at 25° C. as it is and then wound on a wind-up roll (d). As the aqueous dichroic molecules solution in the tray (b), there is used a solution prepared by adding 1 part of Emalgen 108 to 10 parts of a violet dye (C.I. Direct Blue 67), and diluting the resulting mixture with 89 parts of distilled water.

When the filmy multi-axial polarizing element (plate) thus finished is observed through a separately produced polarizing plate, an image with bright and dark stripes of 2 cm is obtained. When the polarizing plate is turned 90°, there is obtained an image with stripes in which light and darkness have been reversed. It can be seen that the multi-axial polarizing element (plate) is a biaxial polarizing element (plate) having axes of 2 cm width which intersect perpendicularly to each other.

Example 12

Stereoscopic display polarizing element (plate)

A solution consisting of 1 part of the same polymer having azobenzene groups as obtained in Example 1 and 99 parts of toluene is spin-coated on two triacetyl cellulose (TAC) films and dried by heating at 105° C. for 10 minutes. A 500 W/h ultrahigh-pressure mercury lamp is used as a light source, and light therefrom is converted to visible light (>400 nm) by means of a cut off filter and then passed through a polarizing plate with an angle of axis of polarization of −45° to be converted to linear polarized light. The coated surface of one of the aforesaid substrates which has been placed in parallel with the axis of polarization of the polarizing plate is irradiated with the linear polarized light from a distance of 50 cm at room temperature for 1 minute. And the angle of axis of polarization is changed to 45°, after which a mask for left eye is placed, followed by irradiation for 1 minute. A dye solution is applied and then dried in the same manner as in Example 1 to obtain a polarizing element (plate) for left eye of the present invention.

Then, the angle of axis of polarization of the polarizing plate is changed to 0° and the other substrate is irradiated with polarized light of visible rays from a distance of 50 cm for 1 minute. Next, the angle of axis of polarization is changed to 90°, and a mask for right eye is placed, followed by irradiation with polarized light of visible rays for 1 minute. A dye solution is applied and then dried in the same manner as in Example 1 to obtain a polarizing element (plate) for right eye of the present invention.

When these two substrates are place one upon another to obtain a stereoscopic display polarizing element and passed through a product obtained by attaching a polarizing plate of −45° and a polarizing plate of 0° to the left and right lenses, repectively, of glasses, an image appears vividly, namely, a three-dimensional image is obtained.

Example 13

Polarizing element (plate) having a curved surface

A watch glass made of hard glass is immersed in a solution consisting of 10 parts of the same polymer having azobenzene groups as obtained in Example 1 and 90 parts of toluene, dried by heating at 105° C. for 10 minutes, and then irradiated with linear polarized light in the same manner as in Example 1. Then, an aqueous solution prepared by adding 1 part of Emalgen 108 to 10 parts of a black dye (Black 1) consisting of C.I. Direct Orange 72, C.I. Direct Blue 67 and C.I. Direct Green 51, followed by dilution with 89 parts of distilled water is spin-coated on the watch glass and dried under conditions of 25° C. and 50% RH to obtain a polarizing element (plate) of the present invention. When this substrate is observed through a polarizing plate, a contrast between light and darkness appears. When the polarizing plate is turned, light and darkness are reversed every 90°, namely, the substrate shows the same behavior as that of a conventional polarizing plate. This polarizing element (plate) has an average single-plate transmittance Ys of 30% and an average polarization rate ρ of 78.8%.

Example 14

Polarizing element (plate) having a curved surface

A solution consisting of 10 parts of the same polymer containing azobenzene as obtained in Example 1 and 90 parts of toluene is spin-coated on a commercially available lens of eyeglasses and dried by heating at 105° C. for 10 minutes. Light from a 40 W/h black lamp (BL) is passed through a polarizing plate to obtain linear polarized light, and the coated surface of the aforesaid lens of glasses placed in parallel with the axis of polarization of the polarizing plate is irradiated with the linear polarized light at room temperature for 10 minutes. The same aqueous dye solution as in Example 13 is spin-coated on the irradiated surface and then dried under conditions of 25° C. and 50% RH to obtain a polarizing element (plate) of the present invention. This polarizing element (plate) has an average single-plate transmittance Ys of 32% and an average polarization rate p of 77.1%.

Example 15

Polarizing element (plate) having a curved surface

A solution consisting of 10 parts of the same polymer as obtained in Example 2 and 90 parts of toluene is spin-coated on a commercially available lens of eyeglasses and dried by heating at 105° C. for 10 minutes. Irradiation with linear polarized light and application and drying of a dye solution are carried out in the same manner as in Example 13 to obtain a polarizing element (plate) of the present invention. This polarizing element (plate) has an average single-plate transmittance Ys of 42.1% and an average polarization rate p of 75.6%.

Example 16

Polarizing element (plate) having a curved surface

2-Methacryloyloxyazobenzene is dissolved in benzene to obtain a 20 wt % solution, and the solution is subjected to polymerization with deaeration at 60° C. for 12 hours by using azobisisobutylonitrile as an initiator. A solution consisting of 10 parts of the resulting polymer having azobenzene and 90 parts of toluene is spin-coated on a commercially available lens of eyeglasses and dried by heating at 105° C. for 10 minutes. Then, in the same manner as in Example 13, the coated surface of the lens of eyeglasses is irradiated with linear polarized light and an aqueous dye solution is applied and then dried to obtain a polarizing element (plate) of the present invention. This polarizing element (plate) has an average single-plate transmittance Ys of 29.5% and an average polarization rate p of 70.2%.

Example 17

Polarizing element (plate) having a curved surface (4'-Methacryloyloxy)-4-cyanoazobenzene is dissolved in benzene to obtain a 20 wt % solution, and the solution is subjected to polymerization with deaeration at 60° C. for 12 hours by using azobisisobutylonitrile as an initiator. A solution consisting of 10 parts of the resulting polymer having cyanoazobenzene and 90 parts of THF is spin-coated on a commercially available lens of eyeglasses and dried by heating at 105° C. for 10 minutes. Then, in the same manner as in Example 13, the coated surface of the lens of eyeglasses is irradiated with linear polarized light and an aqueous dye solution is applied and then dried to obtain a polarizing element (plate) of the present invention. This polarizing element (plate) has an average single-plate transmittance Ys of 28.1% and an average polarization rate p of 68.9%.

Example 18

Polarizing element (plate) having a curved surface

4-Methacryloyloxystilbene is dissolved in benzene to obtain a 20 wt % solution, and the solution is subjected to polymerization with deaeration at 60° C. for 12 hours by using azobisisobutylonitrile as an initiator. A solution consisting of 10 parts of the resulting polymer having azobenzene and 90 parts of toluene is spin-coated on a commercially available lens of eyeglasses and dried by heating at 105° C. for 10 minutes. Then, in the same manner as in Example 13, the coated surface of the lens of eyeglasses is irradiated with linear polarized light and an aqueous dye solution is applied and then dried to obtain a polarizing element (plate) of the present invention. This polarizing element (plate) has an average single-plate transmittance Ys of 32.4% and an average polarization rate p of 76.3%.

Example 19

Corona discharge treatment

A solution consisting of 10 parts of the same polymer containing azobenzene as obtained in Example 1 and 90 parts of toluene is spin-coated on a TAC film and dried by heating at 105° C. for 10 minutes. Corona discharge treatment is carried out on the film at a rate of movement of 12 m/sec and a preset energy of 150 W.min.m−2. Irradiation with linear polarized light and application and drying of an aqueous dye solution are carried out in the same manner as in Example 13 to obtain a polarizing element (plate) of the present invention. This polarizing element (plate) has an average single-plate transmittance Ys of 35% and an average polarization rate p of 93%.

Examples 20–24

Corona discharge treatment

Photoactive molecules having a hydroxyl group are esterified with methacryloyl chloride to prepare a monomer, and the monomer is subjected to radical polymerization in the same manner as in Example 1 to obtain a polymer. A solution of the polymer is applied on the surface of a film substrate in the same manner as in Example 1 and dried to obtain a thin film, after which corona discharge treatment is carried on the thin film under the conditions described in Table 3. Then, irradiation with linear polarized light and application and drying of an aqueous dye solution are carried out in the same manner as in Example 13 to obtain a polarizing element (plate) of the present invention. The average single-plate transmittance Ys and average polarization rate p of the polarizing elements (plates) thus obtainedare shown in Table 3. In the table, PET denotes poly(ethylene terephthalate), TAC triacetyl cellulose, PP polyproylene, p-HAB p-hydroxyazobenzene, o-HAB o-hydrooxyazobenzene, HCA hydroxycyanoazobenzene, and HS p-hydroxystilbene.

TABLE 3

| Example | Substrate | Photoactive molecules | Corona discharge treatment conditions | | Ys (%) | p (%) |
|---|---|---|---|---|---|---|
| | | | Rate of movement (m/min) | Preset energy (W*min/m²) | | |
| 20 | PET | p-HAB | 15 | 60 | 33.8 | 81.9 |
| 21 | TAC | p-HAB | 15 | 150 | 34.6 | 95.4 |
| 22 | TAC | o-HAB | 12 | 150 | 34.1 | 81.3 |
| 23 | PP | HCA | 12 | 150 | 29.0 | 86.9 |
| 24 | PET | HS | 12 | 150 | 30.7 | 87.6 |

Example 25

Ultraviolet treatment

A solution consisting of 10 parts of the same polymer containing azobenzene as obtained in Example 1 and 90 parts of toluene is spin-coated on a glass plate and dried by heating at 105° C. for 10 minutes. The glass plate is placed in the chamber of UV Ozone Cleaner NL-UV 253 manufactured by Nippon Laser & Electronic Lab. (lamp output 0.7 W, main peak wavelengths 185 nm and 254 nm, irradiation distance 10 cm) and treated in an oxygen stream for 5 minutes. Then, irradiation with linear polarized light and application and drying of an aqueous dye solution are carried out in the same manner as in Example 13 to obtain a polarizing element (plate) of the present invention. This polarizing element (plate) has an average single-plate transmittance Ys of 32% and an average polarization rate ρ of 89%.

The polarizing element (plate) of the present invention is obtained as follows:photoactive molecules are previously attached to or dispersed in the surface layer of a substrate, and then irradiated with linear polarized light having a wavelength at which the photoactive molecules absorb the linear polarized light, after which one kind or two or more kinds of dichroic molecules are adsorbed on the photoactive molecular layer. It can be considered that the reason why the polarizing element (plate) can be obtained by such a photochemical method is that the photoactive molecules whose molecular axes have been aligned in a definite direction by the irradiation with linear polarized light determine the direction of alignment of the molecular axes of the dichroic molecules in a solid state adsorbed on the photoactive molecules. In addition, the transmittance and the polarization rate can be further increased by subjecting the photoactive molecular layer to corona discharge treatment or UV irradiation.

According to the present invention, a polarizing element can be obtained by merely adsorbing dichroic molecules on photoactive molecules irradiated with linear polarized light. Therefore, a polarizing element having a large area can easily be produced without a stretching procedure. There can be produced not only a flat polarizing element but also a polarizing element having a curved surface. In addition, the structure of the dichroic molecules used includes various structures, and a polarizing element having an optional color tone can be produced by choosing one kind or a mixture of two or more kinds of dichroic molecules. Furthermore, since the process for producing the polarizing element is a photochemical process, there can very easily be produced a polarizing element having a very fine and complicated pattern which cannot be produced by a conventional process. In particular, before the adsorption of the dichroic molecules, the orientation of the photoactive molecules is reversible, so that the direction of alignment of the molecular axes of the photoactive molecules can be optionally changed by turning the axis of the linear polarized light. Therefore, a desired pattern can be baked on the photoactive molecules by repeated drawing by irradiation of a plurality of linear polarized lights different in axis of polarization, and can easily be modified. When a layer of the dichroic molecules in a solid state is formed on the photoactive molecules, the molecular alignment of the photoactive molecules is not changed even by the irradiation with linear polarized light having a different axis of polarization and is stable for a long period of time.

INDUSTRIAL APPLICABILITY

The present invention permits mass production of, for example, gradation display polarizing elements (plates), multi-axial polarizing elements (plates) and polarizing elements (plates) with a curved surface by a simple production process, and production of various visible display devices such as stereoscopic display polarizing elements (plates) by combination of the above-mentioned polarizing elements (plates) with each other or with conventional polarizing plates for linear polarized light.

We claim:

1. A polarizing element or polarizing plate having a first layer having photoactive molecules containing at least one double bond selected from non-aromatic C=C, non-aromatic C=N and non-aromatic N=N and a second layer containing dichroic molecules formed in contact with said first layer.

2. A polarizing element or polarizing plate according to claim 1, wherein the first layer having photoactive molecules is formed on a substrate, and a protective layer is formed on the second layer containing dichroic molecules.

3. A polarizing element or a polarizing plate according to claim 1 or 2, wherein said second layer containing the dichroic molecules is in a solid state.

4. A polarizing element or polarizing plate according to claim 1 or 2, wherein the dichroic molecules are those of a compound having a hydrophilic substituent.

5. A polarizing element or polarizing plate according to claim 4, wherein the hydrophilic substituent is a sulfonic acid group, an amino group or a hydroxyl group.

6. A polarizing element or polarizing plate according to claim 2, wherein the substrate is flat or has a curved surface.

7. A process for producing a polarizing element or polarizing plate, characterized by irradiating a layer having photoactive molecules containing at least one double bond selected from non-aromatic C=C, non-aromatic C=N and non-aromatic N=N on a substrate with linear polarized light, and then forming a layer containing dichroic molecules on the photoactive molecular layer.

8. A process for producing a polarizing element or polarizing plate according to claim 7, characterized in that the layer having photoactive molecules on the substrate is subjected to corona discharge treatment or ultraviolet irradiation treatment.

9. A gradation display polarizing element or polarizing plate having a first layer having photoactive molecules containing at least one double bond selected from non-aromatic C=C, non-aromatic C=N and non-aromatic N=N and a second layer containing dichroic molecules formed in contact with said first layer having photoactive molecules.

10. A process for producing a gradation display polarizing element or polarizing plate, characterized by irradiating a layer having photoactive molecules containing at least one double bond selected from non-aromatic C=C , non-aromatic C=N and non-aromatic N=N on a substrate with linear polarized light through a mask composed of portions different in depth of color, and then forming a layer containing dichroic molecules on the photoactive molecular layer.

11. A multi-axial polarizing element or polarizing plate having a layer having photoactive molecules containing at least one double bond selected from non-aromatic C=C, non-aromatic C=N and non-aromatic N=N and a layer containing dichroic molecules formed in contact with the former layer.

12. A process for producing a multi-axial polarizing element or polarizing plate, characterized by irradiating a layer having photoactive molecules containing at least one double bond selected from non-aromatic C=C, non-aromatic C=N and non-aromatic N=N on a substrate with two or more kinds of linear polarized lights having different axes of rotation, and then forming a layer containing dichroic molecules on the photoactive molecular layer.

13. A stereoscopic display polarizing element or polarizing plate having a first layer having photoactive molecules containing at least one double bond selected from non-aromatic C=C, non-aromatic C=N and non-aromatic N=N and a second layer containing dichroic molecules formed in contact with said first layer having photoactive molecules.

* * * * *